（12）United States Patent　　　　　　　　　　(10) Patent No.:　　US 10,028,604 B2
Gonzalez et al.　　　　　　　　　　　　　　　　 (45) Date of Patent:　　\*Jul. 24, 2018

(54) BABY BOTTLE BLENDER

(71) Applicants: Osmay Gonzalez, Miami Lakes, FL (US); Omar Gonzalez, Miami Lakes, FL (US)

(72) Inventors: Osmay Gonzalez, Miami Lakes, FL (US); Omar Gonzalez, Miami Lakes, FL (US)

(73) Assignee: Easy Parents, LLC, Hialeah Gardens, FL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/722,614

(22) Filed: Oct. 2, 2017

(65) Prior Publication Data

US 2018/0020853 A1　　Jan. 25, 2018

Related U.S. Application Data

(63) Continuation of application No. 14/730,685, filed on Jun. 4, 2015, now Pat. No. 9,775,454.

(51) Int. Cl.
| | |
|---|---|
| *A47J 43/046* | (2006.01) |
| *A47G 19/22* | (2006.01) |
| *A61J 11/02* | (2006.01) |
| *A61J 9/06* | (2006.01) |
| *A47J 43/042* | (2006.01) |
| *B01F 1/00* | (2006.01) |
| *B01F 7/00* | (2006.01) |
| *B01F 7/16* | (2006.01) |
| *B01F 13/00* | (2006.01) |

(Continued)

(52) U.S. Cl.
CPC ........ *A47G 19/2272* (2013.01); *A47J 43/042* (2013.01); *A61J 9/0623* (2015.05); *A61J 11/02* (2013.01); *B01F 1/0011* (2013.01); *B01F 7/00583* (2013.01); *B01F 7/162* (2013.01); *B01F 13/0022* (2013.01); *B01F 15/00519* (2013.01); *A61J 11/008* (2013.01)

(58) Field of Classification Search
CPC ..................................................... A47J 43/046
USPC ................................ 366/130, 205, 206, 314
See application file for complete search history.

(56) References Cited

U.S. PATENT DOCUMENTS

| | | | | | |
|---|---|---|---|---|---|
| 811,000 | A | \* | 1/1906 | Tompkins | ............... F16L 23/22 |
| | | | | | 277/609 |
| 1,539,222 | A | \* | 5/1925 | Turner | .................. B65D 53/02 |
| | | | | | 277/630 |

(Continued)

FOREIGN PATENT DOCUMENTS

CN　　　　202128714　　　　2/2012

*Primary Examiner* — David Sorkin
(74) *Attorney, Agent, or Firm* — Malloy & Malloy, PL

(57) ABSTRACT

A baby bottle blender includes a baby bottle having a top collar and a bottom collar, and a nipple. The nipple cap is removably attached to the top collar of the baby bottle and holds the nipple extending through a central aperture of the nipple cap onto the top collar. An agitating unit is centrally retained within a bottom attaching cap. A base member has a top recess to engage the agitating unit. An electrical mechanism in the base member operates the agitating unit, so that the agitating unit will thoroughly blend a formula in a liquid in the baby bottle in approximately seven seconds.

18 Claims, 8 Drawing Sheets

(51) Int. Cl.
  *B01F 15/00*   (2006.01)
  *A61J 11/00*   (2006.01)

(56) References Cited

U.S. PATENT DOCUMENTS

| | | | |
|---|---|---|---|
| 2,462,762 A * | 2/1949 | Nardin | F16L 23/22 |
| | | | 277/609 |
| 2,640,907 A | 6/1953 | Morey | |
| 3,704,684 A | 12/1972 | Brown | |
| 3,704,864 A | 12/1972 | Lee | |
| 3,735,888 A | 5/1973 | Jacko | |
| 3,881,705 A | 5/1975 | Greenspan | |
| 5,052,593 A | 10/1991 | Grome et al. | |
| 5,425,579 A | 6/1995 | Sampson | |
| 5,639,161 A | 6/1997 | Sirianni | |
| 5,720,552 A | 2/1998 | Schindlegger | |
| 5,797,313 A | 8/1998 | Rothley | |
| 5,911,504 A | 6/1999 | Schindlegger, Jr. | |
| 6,283,627 B1 | 9/2001 | Fromm | |
| 7,066,640 B2 | 6/2006 | Sands | |
| 7,220,049 B2 | 5/2007 | Lee | |
| 7,281,842 B2 | 10/2007 | Dickson, Jr. | |
| 7,371,004 B1 | 5/2008 | Branson, III et al. | |
| 7,430,957 B2 | 10/2008 | Sands | |
| 8,152,083 B2 | 4/2012 | Bower et al. | |
| 8,529,118 B2 | 9/2013 | Davis et al. | |
| 8,851,739 B2 | 10/2014 | Gonzalez | |
| 9,775,454 B2 * | 10/2017 | Gonzalez | A47G 19/2272 |
| 2005/0056611 A1 | 3/2005 | Hakim | |
| 2005/0105387 A1 | 5/2005 | Nikkhah | |
| 2006/0007781 A1 | 1/2006 | Martin et al. | |
| 2008/0037360 A1 | 2/2008 | McGill | |
| 2008/0047439 A1 | 2/2008 | Tracy et al. | |
| 2008/0217284 A1 | 9/2008 | Roth et al. | |
| 2008/0259722 A1 | 10/2008 | Sanford | |
| 2008/0304356 A1 | 12/2008 | Zhuang | |
| 2009/0260523 A1 | 10/2009 | Peng | |
| 2009/0301904 A1 | 12/2009 | Bullard et al. | |
| 2010/0072162 A1 | 3/2010 | Park | |
| 2011/0024537 A1 * | 2/2011 | Gonzalez | A47J 43/046 |
| | | | 241/101.2 |
| 2011/0226802 A1 | 9/2011 | Moore et al. | |
| 2012/0181245 A1 | 7/2012 | Lam | |
| 2013/0039145 A1 | 2/2013 | Pollaro et al. | |
| 2014/0069606 A1 | 3/2014 | Lee | |
| 2015/0114024 A1 | 4/2015 | Grepper | |

* cited by examiner

BABY BOTTLE BLENDER

BACKGROUND OF THE INVENTION

Field of the Invention

The present invention relates to a mixing apparatus, and more particularly, a baby bottle blender.

The baby bottle blender is a rechargeable battery-operated device that can be utilized to easily and thoroughly mix formula in a baby bottle. The present invention can assist individuals in creating a baby bottle of formula for an infant in seconds, even when a standard blender may not be available. The baby bottle blender is ideal for use when traveling or at home to fix an infant a baby bottle of formula with the solution being thoroughly blended with little or no effort. The present invention spins its mixer rapidly creating a powerful cyclone action. This is a much better way to mix up formula because it reduces air bubbles from mixing within the liquid. This help reduces the infant from swallowing air, thereby reducing post feeding discomfort symptoms like gas, spit up, colic and other discomforts. And also completely blending and dissolve all chunks of formula, giving the baby all its nutrients. The baby bottle blender eases the complications of having to shake an ordinary baby bottle.

DESCRIPTION OF THE RELATED ART

When mixing formula in an ordinary baby bottle, one may have to shake it in order for the solution to thoroughly mix. This can be aggravated, especially when done half-asleep in the middle of the night. Manually shaking may also not completely dissolve chunks of formula within the baby bottle resulting in less nutrients given to the infant and clogging the baby bottle nipple. Also shaking an ordinary baby bottle may create more air bubbles within the liquid, thereby increasing post feeding discomfort symptoms like gas, spit up, colic and other discomforts.

Numerous innovations for stirring devices have been provided in the prior art that will be described. Even though these innovations may be suitable for the specific individual purposes to which they address, however, they differ from the present invention.

A FIRST EXAMPLE, U.S. Pat. No. 3,704,864, issued on Dec. 5, 1972, to Lee teaches mixing devices, such as food mixers. One embodiment includes a mixer unit which may be removable, sealingly affixed to the top of a receptacle containing the material to be mixed and the combination thereafter inverted during the mixing operation. Thereby a short-shafted universal mixer device may be used with a wide variety of receptacles.

A SECOND EXAMPLE, U.S. Pat. No. 5,639,161, Issued on Jun. 17, 1997, to Sirianni teaches a blender cup apparatus comprising a rigid hollow base having a top wall, a bottom wall, a peripheral side wall; an open cup coupled to the top wall of the base; a lid removable secured over the cup; a battery removable disposed within the base for supplying electrical energy; a motor having a fixed stator coupled to the battery and base and a rotatable rotor extended upwards through the top wall and into the cup with the stator imparting rotational motion to the rotor; a propeller coupled to the rotor of the motor within the cup; a power switch extended from the base and coupled to the battery; and a pressure switch extended from the base and coupled between the motor and power switch, the power switch having an enabled orientation for allowing delivery of electrical energy to the pressure switch and a disabled orientation for preventing such delivery, the pressure switch having a depressed orientation for allowing electrical energy to be delivered to the motor and further having a released orientation for preventing such delivery.

A THIRD EXAMPLE, U.S. Pat. No. 5,911,504, Issued on Jun. 15, 1999, to Schindlegger Jr. teaches a stirring device for a container, such as a baby bottle, said stirring device exhibiting a recess which closes off the container opening when the container is inverted. The recess is fitted with an inner wall section with an inside thread for screwing in the container. A drive shaft of a stirrer extends through the bottom of the recess. The housing consists of an outer wall section, the inner wall section with the bottom and a ring section which connects the outer wall section with the inner wall section. The housing is closed off with a bottom plate. The batteries that supply electrical power to the stirrer motor are placed vertically between the outer wall section and the inner wall section.

A FOURTH EXAMPLE, U.S. Pat. No. 6,283,627, Issued on Sep. 4, 2001, to Fromm teaches a drink mixer which may be used by children as well as by adults to mix a liquid with a wide variety of ingredients including air, other liquids, or solids, which may be comminuted during mixing. The device consists of four major components or assemblies, these being a tapered cylindrical container (12), a container top assembly (14), a handle assembly (16), and a mixing disk (18) carried by the handle assembly. The parts are so designed so that the mixing disk may be pushed down repeatedly by the handle assembly to mix the liquid within the container with other ingredients, an internal spring returning the mixing disk to its raised position. The container top assembly is secured to the container in a liquid tight manner, the container top assembly having a pour spout which may be covered tightly. A part (110) which changes color when the contents change temperature may be incorporated into the mixer.

A FIFTH EXAMPLE, U.S. Patent Office Publication No. 2005/0105387, Published on May 19, 2005, to Nikkhah teaches a sports bottle blender is disclosed for use with a mixing apparatus to blend mixed drinks. The sports bottle has a top with a closeable opening therein such as a spout. A blade assembly is positioned at the bottom of the sports bottle extending into the sports bottle cavity. When the sports bottle is positioned on a mixing apparatus, such as a blender, the blade assembly operatively engages the blender such that operation of the blender causes the blade assembly to rotate. The rotation of the blade assembly mixes the ingredients in the sports bottle. The lower portion of the sports bottle is preferably detachable from the upper portion to provide easy access to the blade assembly for cleaning.

A SIXTH EXAMPLE, U.S. Pat. No. 7,066,640, Issued on Jun. 27, 2006, to Sands teaches a blender system including a mixing base which is capable of agitating the contents of a plurality of containers. The mixing base includes a rotating shaft, a recessed well, a pressure-actuated switch positioned about the periphery of the recessed well, and a locking groove. One container that may be used with the mixing base has an opening at one end and a base at a second end, where the base is tapered. The container also includes one or more locking members in spaced relation about the periphery of the container body. The container body may be provided with a handle. The container also includes a ring that is selectively attachable and removable from the periphery of the opening such that when the ring is coupled to the container, the user is able to drink from the container without spilling or dripping.

A SEVENTH EXAMPLE, U.S. Pat. No. 7,220,049, Issued on May 22, 2007, to Lee teaches a blender with a safe starting function includes a motor unit, a blade base and a container. The motor unit has an insert groove and a micro switch. The blade base has a hole, a threaded rod, a spring and an actuating member with a press member and an actuating arm. The container has its bottom pressing the press members. In using, the blade base is positioned to let the actuating arm slide in the insert groove and press the micro switch to keep the blender in an on-power position. Then a user presses the on-off button to start the blender. If the blade base is rotated only for a very small angle from the on-power position to an off-power position, with the actuating arm separating from the micro switch, then the blender is in an off-power condition, impossible to be started even the on-off press button should be pressed.

AN EIGHTH EXAMPLE, U.S. Pat. No. 7,281,842, Issued on Oct. 16, 2007, to Dickson Jr. teaches a blending container may include one or more walls and a handle secured to the one or more walls. The blending container may have a generally rectangular shape. The blending container may also include a mixing blade that rotates on an axis. The blending container may be configured so that a vortex created when liquid is blended inside the container is not positioned over the axis. The blending containers may also be configured to stack inside one another.

A NINTH EXAMPLE, U.S. Patent Office Publication No. 2008/0037360, Published on Feb. 14, 2008, to McGill teaches a method of preparing a blended food product includes the steps of: introducing a composition of food product(s) into a container, providing a closure for the container, the closure carrying an impeller; inverting the container so that the closure with its blending element lies lowermost; and driving the blending element to blend the composition to form a blended food product. Prior to blending, the container is mounted in a holder and clamped in place between the closure and the holder, to prevent leakage during blending. The holder may be in the form of a sleeve. A drive master is also provided for use with two sets of blending lids.

A TENTH EXAMPLE, U.S. Patent Office Publication No. 2008/0047439, Published on Feb. 28, 2008, to Tracy et al. teaches a method and apparatus for steaming and blending food products such as baby food. The apparatus includes a base including a steam chamber and a drive shaft. A container assembly can be mounted to the base in an inverted position for steaming the food and in an upright position for blending the food. The apparatus may further include a baby bottle sterilizing unit and a bottle warmer.

AN ELEVENTH EXAMPLE, U.S. Pat. No. 7,371,004, Issued on May 13, 2008, to Branson III et al. teaches a travel mug that is configured to blend food and adapted for being transported with a user in a drinking configuration and for mounting to a blender for blending food therein in a blending configuration. The mug includes a cup body having an open top, an open bottom and a cavity therein. A drinking cap is removable mounted to the top of the cup body. The drinking cap includes a drinking hole and a closure movable between a sealing position wherein the closure seals the drinking hole and an open position where the closure is spaced from the drinking hole. A blade fitting, having a blending blade, is removable mounted to the bottom of the cup body when the travel mug is in the blending configuration. Further, a bottom closure is removable mounted to the bottom of the cup body when the travel mug is in the drinking configuration.

A TWELFTH EXAMPLE, U.S. Pat. No. 7,430,957, Issued on Oct. 7, 2008, to Sands teaches a blender and juicer system comprises a blender container having an open top and an open bottom, and a removable juicer member being open at each end and adapted for insertion into the blender container. The blender container is adapted to prevent the over-insertion of the removable juicer member. The inserted juicer member is adapted to engage operatively the interior of the blender container. The blender and juicer system also comprises a plunger adapted for insertion into the juicer member. The inserted plunger is utilized during a juice extraction operation. The plunger includes a top exterior lip which defines the optimal range of plunger insertion into the juicer member.

A THIRTEENTH EXAMPLE, U.S. Patent Office Publication No. 2008/0259722, Published on Oct. 23, 2008, to Sanford teaches a blender for production of scented materials has mutually connecting containers or chambers that attach to a conventional motorized blender base. The chambers include mixing chamber having a removable blade assembly and base attachment mount, a filtration chamber installed upon the mixing chamber, and a collection chamber installed upon the filtration chamber. The filtration chamber may include one or more scent absorbent pads removable installed in the neck thereof. The blender is used by assembling the mixing chamber upon the blender base, adding ingredients and liquid, installing the filtration and collection chambers, and operating the blender. When the ingredients have been mixed and comminuted, the chamber assembly is removed from the base and inverted to drain the liquid mixture through the scent absorbent discs and into the collection bottle. The discs and collection bottle are then removed for use in distributing the scent.

A FOURTEENTH EXAMPLE, U.S. Patent Office Publication No. 2008/0304356, Published on Dec. 11, 2008, to Zhuang teaches a shaker which is driven by a motor through a swing mechanism so as to swing a wine bottle, for example, drink within the bottle such as wine. The shaker comprises a base, a container, and a bottle seat disposed at a bottom in the container for receiving a bottle body, characterized in that the drink shaker further comprises a swing mechanism disposed in the base and driven by the motor through a conversion mechanism, and the swing mechanism is capable of driving the bottle seat to swing rightward and leftward in a plane or in different planes. The wine is wobbled by the swinging so that the wine continuously rises to a surface of the wine alternatively to be sufficiently and fully oxidized with air. Ice water or warm water can be provided to the shaker as a heat exchange medium. The water is stirred by the swinging of the wine bottle to be uniform in temperature, thereby speeding up cooling or warming of the wine. The shaker has effects of quick breathing, cooling, and warming of wine. The shaker has moving portions, which can excite appetite for drinking. In addition, the power required to swing the drink in the bottle can be reduced to save energy consumption.

A FIFTEENTH EXAMPLE, U.S. Patent Office Publication No. 2009/0260523. Published on Oct. 22, 2009, to Peng teaches a blender (100). Blender (100) comprises a jar (102) having an open top and an open bottom for holding food, a top cap (104) for closing the open top of jar (102), a heated bottom (106) sealingly engaged with the lower end of jar (102) for forming a cooking chamber (107), blending or stirring device (114) installed inside cooking chamber (107) for blending/stirring food, a heating tube (116) fixedly installed on the bottom of heated bottom (106) for heating food, a blender base (112) disposed underneath cooking chamber (107) for supporting cooking chamber (107), a motor (124) installed inside blender base (112) and removable coupled with device (114) for driving device (114) to blend or to stir food, a jar base (110) engaged with the lower portion of jar (102) for adapting cooking chamber (107) to stand on blender base (112), and an in-position detector (128) installed inside blender base (112) for user safety protection.

A SIXTEENTH EXAMPLE, U.S. Patent Office Publication No. 2011/0024537, Published on Feb. 3, 2011, to Gonzalez teaches a portable baby bottle blender includes a baby bottle having a top collar with external threads and a bottom collar with external threads. A top cap has a central aperture. The top cap is internally threaded to be removable threaded onto the top collar of the baby bottle and holds a feeding nipple extending through the central aperture of the top cap onto the top collar. A sealing 0-ring fits onto the bottom collar of the baby bottle. A bottom cap has a rim internally threaded. An agitating unit is centrally retained within the bottom cap. When the rim of the bottom cap is removable threaded onto the bottom collar of the baby bottle and against the sealing O-ring, the agitating unit extends into the bottom collar of the baby bottle. A base member has a top recess to receive the bottom cap on the baby bottle therein. A spur-crown gear coupling is for operating the agitating unit, so that the mixing blade assembly mixes formula within water placed through the top collar of the baby bottle.

A SEVENTEENTH EXAMPLE, U.S. Pat. No. 8,152,083, Issued on Apr. 10, 2012, to Bower et al. teaches an apparatus for preparing food, for instance baby food, the apparatus (1) comprising a receptacle (3) for receiving food to be prepared, a blending assembly comprising a blender element (10) for blending the food and heating means arranged for heating the food, wherein a first end (4) of the receptacle (3) is adapted to cooperate with the heating means to heat the food and wherein the blender element (10) is provided at an opposite second end (5) of the receptacle (3), such that in use an orientation of the receptacle (3) relative to the apparatus (1) is adaptable for switching between a heating operation and a blending operation.

AN EIGHTEENTH EXAMPLE, U.S. Patent Office Publication No. 2013/0039145, Published on Feb. 14, 2013, to Pollaro et al. teaches a mixing apparatus to mix liquid and solids, solids and solids, liquids and liquids or combinations thereof into a homogenous solution in a sealed container shaken in a side to side, up and down, and/or orbital pattern with a warming plate to heat the contents to a desired temperature or for a specific time period with a decreased risk of foreign contaminants in accordance with prescribed instructions for preparing a mixture.

A NINETEENTH EXAMPLE, U.S. Pat. No. 8,529,118, Issued on Sep. 10, 2013, to Davis et al. teaches a beverage container assembly for use with a blender comprising a beverage container having an open top portion and a closed bottom portion. A first removable cover is for selectively covering the top portion of the beverage container. The first cover is adapted to be removable mountable on and off a blender and comprises an adapter portion for mounting the beverage container on a blender. A second removable cover is for selectively covering the open top portion of the beverage container. The second cover includes a drinking hole. The first and second covers are interchangeable on the beverage container and the second cover is mountable on the closed bottom portion for storage.

It is apparent now that numerous innovations for stirring devices have been provided in the prior art that are adequate for various purposes. Furthermore, even though these innovations may be suitable for the specific individual purposes to which they address, accordingly, they would not be suitable for the purposes of the present invention as heretofore described.

SUMMARY

A FIRST OBJECT of the present invention is to provide a baby bottle blender that avoids the disadvantages of the prior art.

A SECOND OBJECT of the present invention is to provide a baby bottle blender that is designed with a high powered motor and batteries to get maximum blending power to blend either baby rice cereal or baby oatmeal cereal which are a much thicker formula additive.

A THIRD OBJECT of the present invention is to provide a baby bottle blender that is designed to be quickly disassembled and reassembled for easy cleaning.

A FOURTH OBJECT of the present invention is to provide a baby bottle blender that has an anti-colic air vent on the nipple. The air vent, ensure a steady flow of liquid to help prevent the infant from swallowing air, thereby reducing post feeding discomfort symptoms like gas, spit up, colic and other discomforts and a more comfortable feeding experience for the infant.

A FIFTH OBJECT of the present invention is to provide a baby bottle blender that also comes with a sippy type nipple for older children to drink their chocolate milk that the blender mixes for them.

A SIXTH OBJECT of the present invention is to provide a baby bottle blender that may also come with a handle sleeve transforming the bottle to a cup. The hand grips make it possible for older babies to hold their bottle in complete comfort. These handles are easy to use with bottle snap-on feature. Snap on to use; snap off to clean, and are perfectly designed for little hands.

A SEVENTH OBJECT of the present invention is to provide a baby bottle blender that takes approximately seven (7) seconds to thoroughly blend the formula.

An EIGHTH OBJECT of the present invention is to provide a baby bottle blender that can come with a USB port in which a USB charger can plug into.

AN NINTH OBJECT of the present invention is to provide a baby bottle blender that comes with a LED indicator light on the base member that when green is one hundred (100) percent charged, yellow when fifty (50) percent charged and red when twenty five (25) percent charged.

A TENTH OBJECT of the present invention is to provide a baby bottle blender that comes with a plurality of rechargeable batteries.

A ELEVENTH OBJECT of the present invention is to provide a baby bottle blender that comes with an ON/OFF baggage safety switch in the base member for traveling purposes, so that the power will not turn on in your baggage by accident, resulting in discharged batteries.

A TWELFTH OBJECT of the present invention is to provide a baby bottle blender that contains an animal-shaped character mixing blade with downwardly extending arms which will mix the formula perfectly in the bottom of the baby bottle.

A THIRTEENTH OBJECT of the present invention is to provide a baby bottle blender that creates a powerful cyclone action while mixing. This is a much better way to mix up formula because it reduces air bubbles from mixing within the liquid. This help reduces the infant from swallowing air, thereby reducing post feeding discomfort symptoms like gas, spit up, colic and other discomforts.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

The figures of the drawings are briefly described as follows.

DETAILED DESCRIPTION

Referring now to the figures, in which like numerals indicate like parts, will be discussed with reference thereto.

Figure 1:
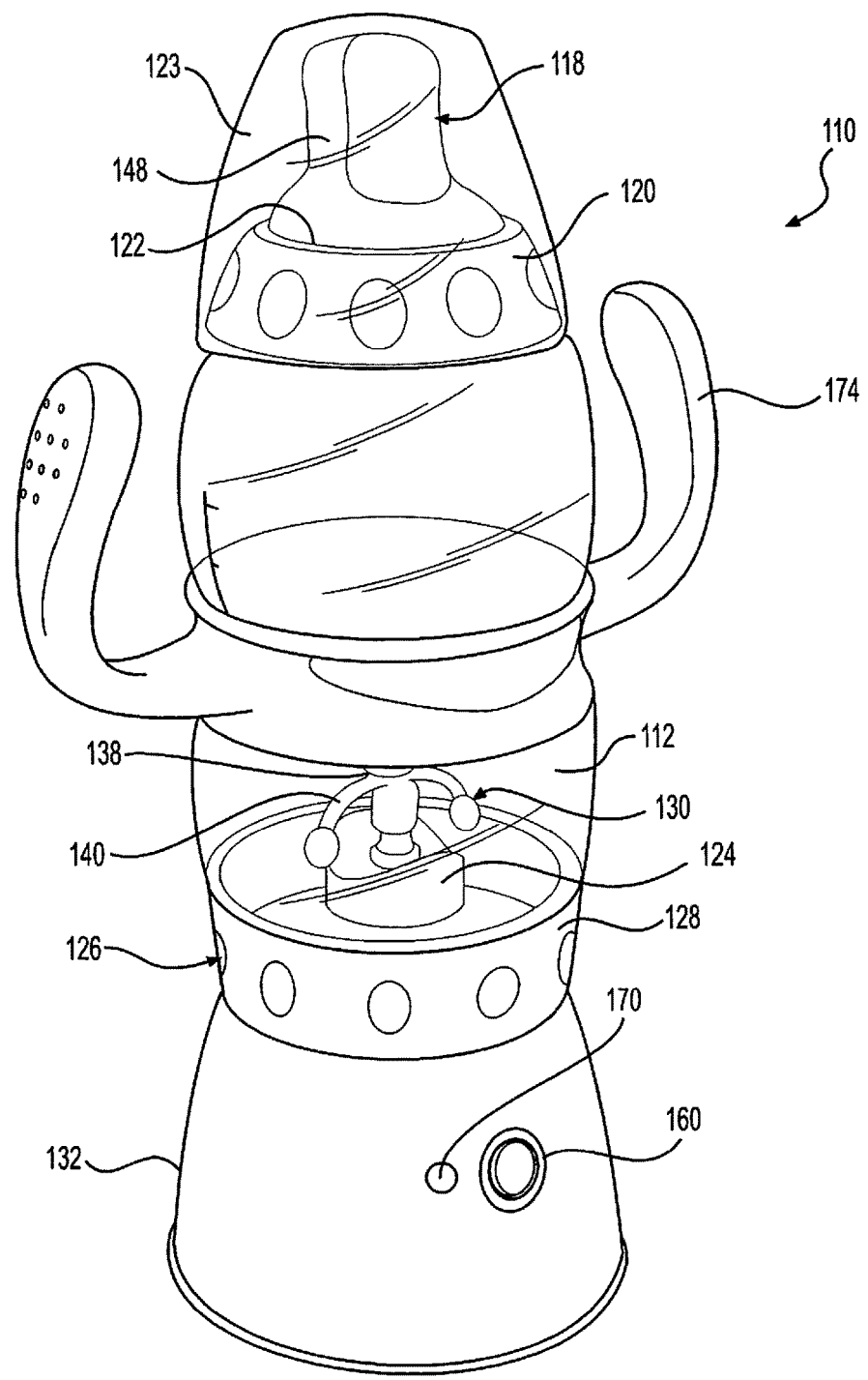
FIG. 1 is a front perspective view of the present invention assembled.
Figure 2:
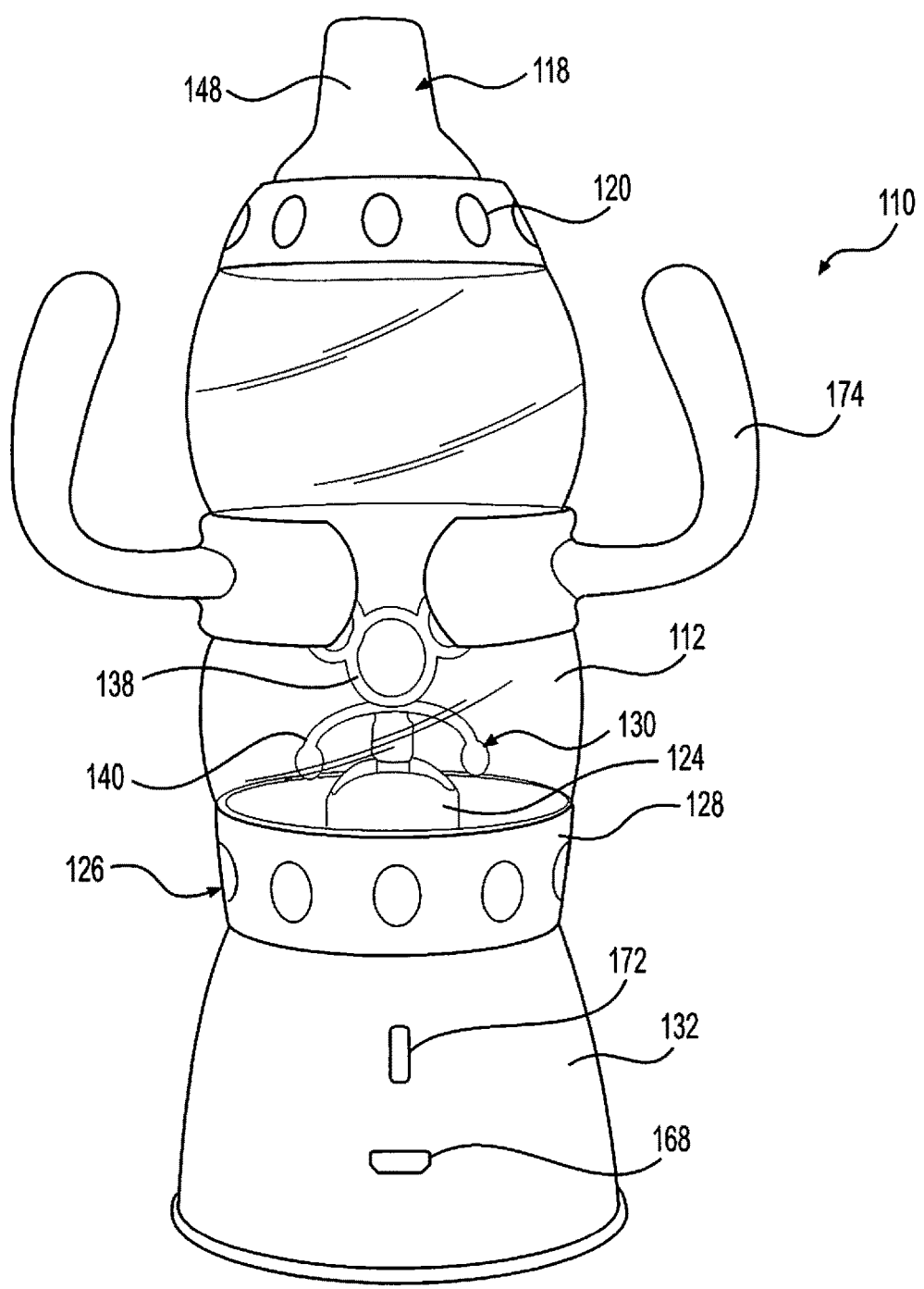
FIG. 2 is an enlarged partial rear perspective view of the present invention.
Figure 4:
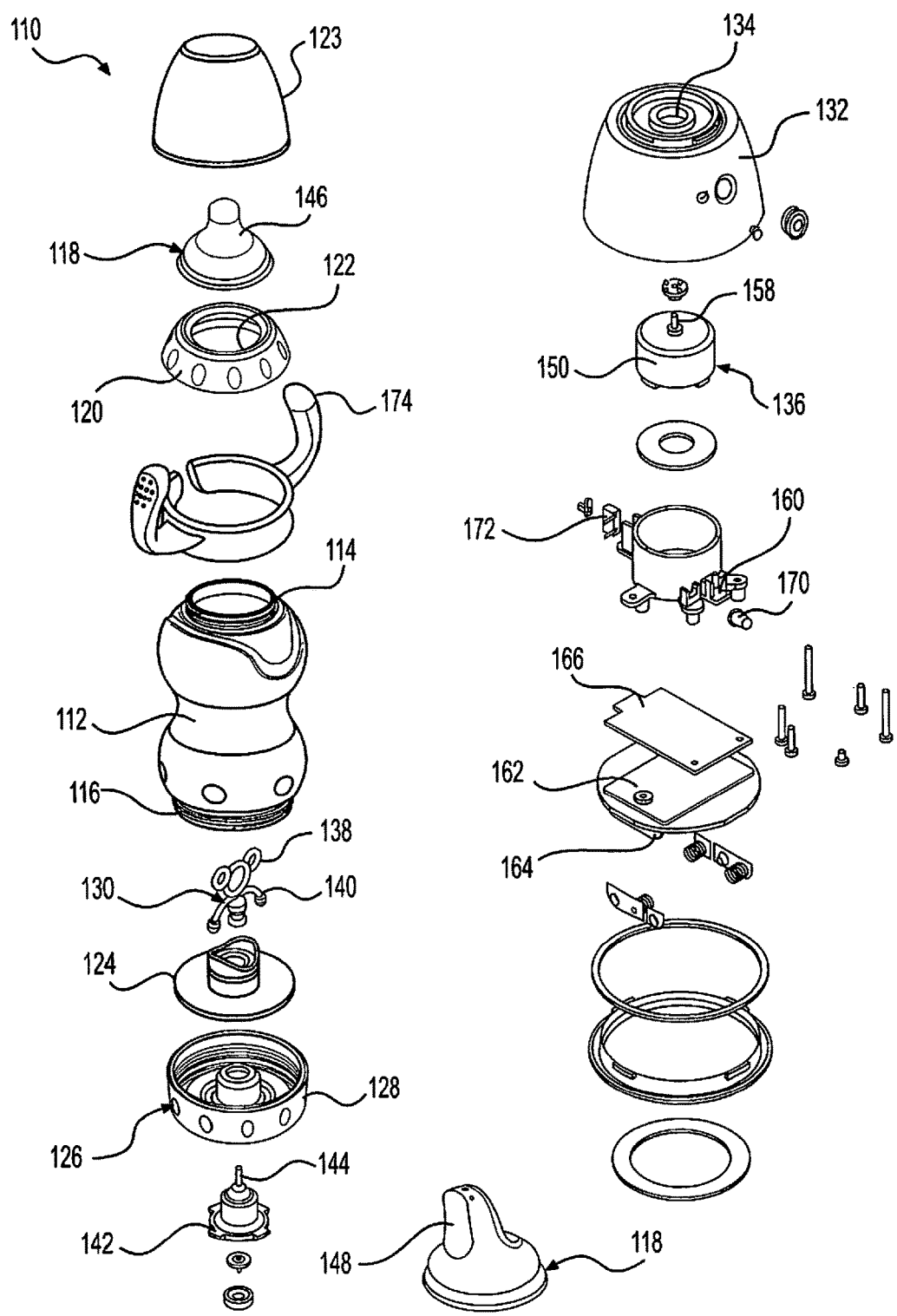
FIG. 4 is an exploded perspective view showing the various components of the present invention.

As shown in FIGS. 1-2 and 4: a baby bottle blender 110 comprises a baby bottle 112 having a top collar 114 with external threads and a bottom collar 116 with external threads. A nipple cap 120 has a central aperture 122. The nipple cap 120 is internally threaded to be removable threaded onto the top collar 114 of the baby bottle 112 and holds the nipple 118 extending through the central aperture 122 of the nipple cap 120 on the top collar 114. A top cover 123 snaps over the nipple cap 120 and covers the nipple 118. A sealing o-ring disk 124 fits in to the bottom attaching cap 126.

The bottom attaching cap 126 has a rim 128 internally threaded. An agitating unit 130 is centrally retained within the bottom attaching cap 126. When the rim 128 of the bottom attaching cap 126 is removable threaded onto the bottom collar 116 of the baby bottle 112 and against the sealing o-ring disk 124, the agitating unit 130 will extend into the bottom collar 116 of the baby bottle 112. A base member 132 has a top recess 134 to engage with the agitating unit 130 in the bottom attaching cap 126 on the baby bottle 112. A snap-on bottle handle 174 with two upward arms is provided.

Figure 3:
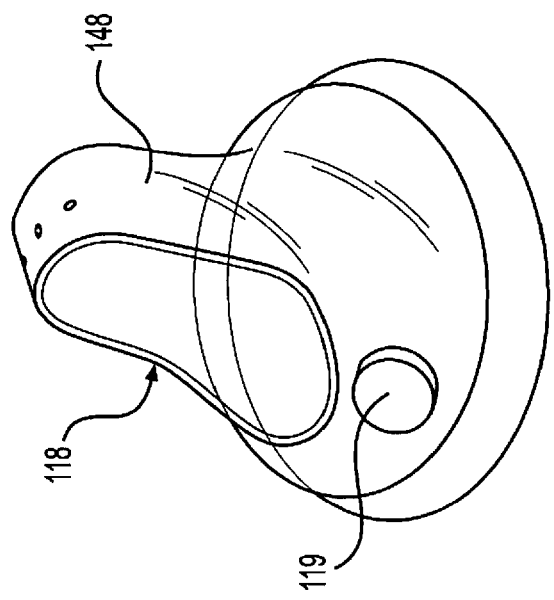
FIG. 3 is an enlarged perspective view showing the two types of nipples used in the present invention.
Figure 3:
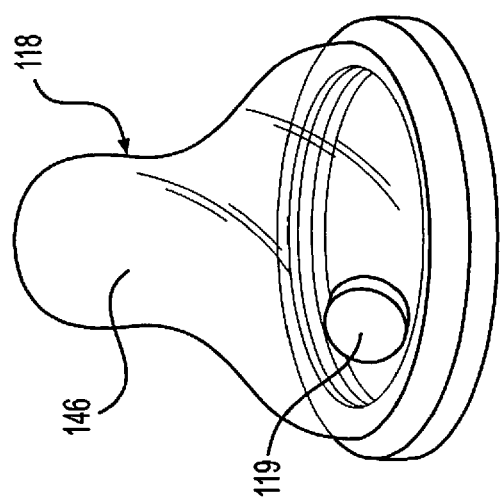

As shown in FIG. 3: The nipple 118 is comprised of either a conventional type nipple 146 or a sippy type nipple 148. The nipple 118 further has an anti-colic air vent 119.

As shown in FIG. 4: a baby bottle blender 110 comprises a baby bottle 112 having a top collar 114 with external threads and a bottom collar 116 with external threads. A nipple cap 120 has a central aperture 122. The nipple cap 120 is internally threaded to be removable threaded onto the top collar 114 of the baby bottle 112 and holds the nipple 118 extending through the central aperture 122 of the nipple cap 120 on the top collar 114. A top cover 123 snaps over the nipple cap 120 and covers the nipple 118. A sealing o-ring disk 124 fits in to the bottom attaching cap 126. A snap-on bottle handle 174 with two upward arms is provided.

The bottom attaching cap 126 has a rim 128 internally threaded. An agitating unit 130 is centrally retained within the bottom attaching cap 126. When the rim 128 of the bottom attaching cap 126 is removable threaded onto the bottom collar 116 of the baby bottle 112 and against the sealing o-ring disk 124, the agitating unit 130 will extend into the bottom collar 116 of the baby bottle 112. A base member 132 has a top recess 134 to engage with the agitating unit 130 in the bottom attaching cap 126 on the baby bottle 112. The nipple 118 is comprised of either a conventional type nipple 146 or a sippy type nipple 148.

A mechanism 136 in the base member 132 is for operating the agitating unit 130, so that the agitating unit 130 will mix formula within a liquid placed through the top collar 114 of the baby bottle 112 in approximately seven (7) seconds to thoroughly blend the formula. The sealing o-ring disk 124 fits onto the bottom collar 116 of the baby bottle 112.

The agitating unit 130 comprises an animal-shaped character mixing blade 138 having two downwardly extending arms 140 to help mix the formula within the liquid. A transfer case 142 is provided having a vertical driven shaft 144 that is located under the bottom attaching cap 126 with the vertical driven shaft 144 coupled to the animal-shaped character mixing blade 138.

The operating mechanism 136 further comprises an electric motor 150 secured in the base member 132. The electric motor 150 has a vertical drive shaft 158 that extends through the top recess 134 of the base member 132 and is removable coupled to the transfer case 142 of the agitating unit 130 in the bottom attaching cap 126.

A ON/OFF push button switch 160 on the base member 132 is electrically connected to the electric motor 150. A power source 162 in the base member 132 is electrically connected to the ON/OFF push button switch 160. When the ON/OFF push button switch 160 is turned on the power source 162 will activate the electric motor 150 to rotate the drive shaft 158 causing the animal-shaped character mixing blade 138 of the activating unit 130 to spin.

The power source 162 is comprised of a plurality of rechargeable batteries 164 mounted therein and electrically connected to the rechargeable batteries 164.

The operating mechanism 136 is located in the base member 132, which houses the rechargeable batteries 164, the electric motor 150 and the vertical drive shaft 158.

The base member 132 has a top recess 134 in the center in which the vertical shaft 158 extends through the bottom attaching cap 126, into the agitating unit 130. The agitating unit 130 has an animal-shaped character mixing blade 138 that spins to mix the formula. A sealing o-ring disk 124 prevents any formula liquid from leaking.

The baby bottle 112 is contoured but is basically straight, so that the bottom attaching cap 126, and the nipple cap 120 for the nipple 118 can be easily screwed onto both ends.

Figure 5:
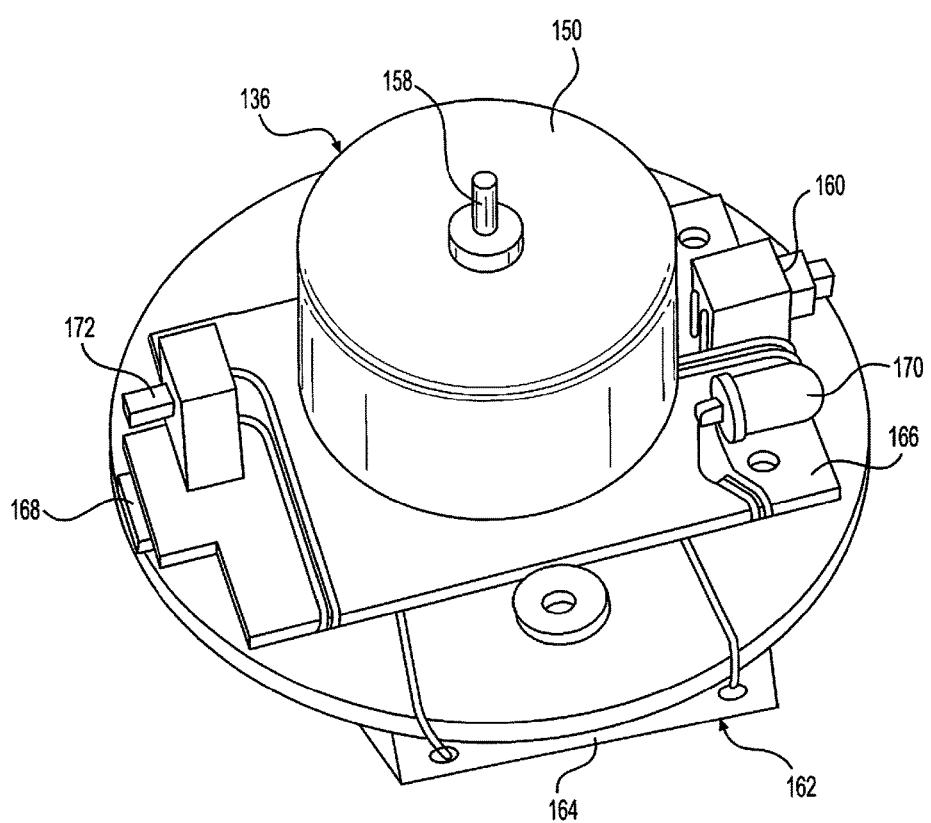
FIG. 5 is an enlarged assembled perspective view showing the electrical components of the present invention.

As shown in FIG. 5: A USB port 168 on the base member 132 is electrically connected to the printed circuit board 166 to allow a USB charger to charge the rechargeable batteries 164.

An LED indicator light 170 is electrically connected between the printed circuit board 166 and the rechargeable batteries 164. When the LED indicator light 170 is green the rechargeable batteries 164 are one hundred (100) percent charged. When the LED indicator light 170 is yellow the rechargeable batteries are fifty (50) percent charged. When the LED indicator light 170 is red the rechargeable batteries 164 are twenty five (25) percent charged. An ON/OFF baggage safety switch 172 on the base member 132 is electrically connected to the printed circuit board 166. When traveling the power will not be turned ON by accident in the baggage resulting in discharging the batteries 164.

The range of the batteries 164 is from 1.2 volts to 9 volts. The motor 150 can have a speed from 1,500 rpm 15,000 rpm. An optional speed controller can be used and set to slow, medium or fast for a three speed motor.

A battery housing door can be on the base member 132 and may slide OFF and ON. On the base member 132, there is an ON/OFF push button switch 160 to turn the operating mechanism 136 OFF and ON. A home and car charging member may also be utilized.

Figure 6:
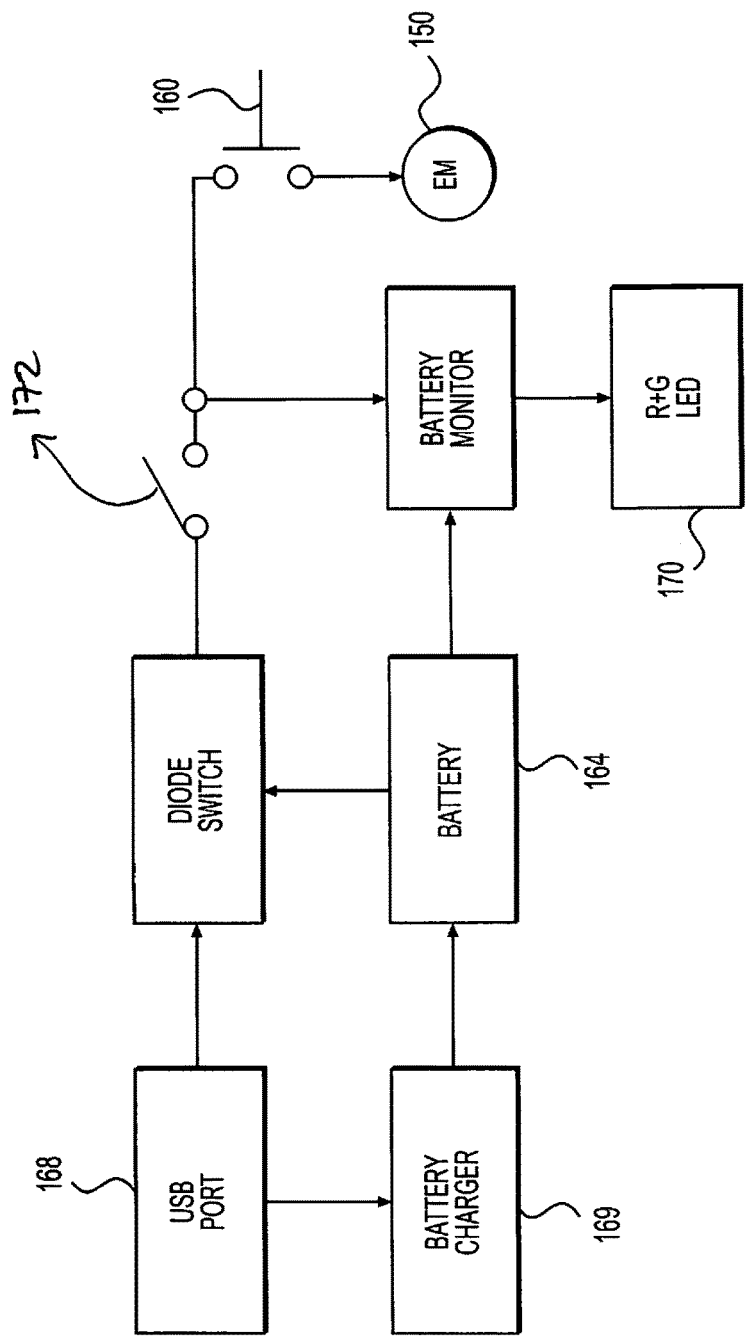
FIG. 6 is a circuit block diagram of the electrical components of the present invention.

As shown in FIG. 6: a circuit block diagram (located on the circuit board 166) to control a small DC-motor for the baby blender 110, monitor the battery voltage and charge the rechargeable battery 164 using an USB port 168. When the battery 164 is connected, it feeds the battery monitor and the motor 150. The power supply for this section is controlled by an ON/OFF baggage safety switch 172. When the switch is on the electronics for the battery monitor start working and uses an LED indicator light 170 to display the battery voltage. To activate the motor 150, the user has to press the ON/OFF push button switch 160 and the ON/OFF baggage safety switch 172 has to be ON.

The circuit block also works for fast-charge management of nickel cadmium (NiCd), nickel metal-hydride (NiMH), or lithium-ion (Li-Ion) batteries. When a user adds power to the USB port 168; a battery charger 169 starts working automatically. The function of the diode switch is to select automatically between USB or battery depending on the voltage. The higher voltage is selected to feed the battery monitor and motor sections. The circuit block chooses the proper battery chemistry (either nickel or lithium) and proceeds with an optimal charging and termination algorithms. This process eliminates undesirable, undercharged, or overcharged conditions, and allows accurate and safe termination of fast charge. Depending on the chemistry, the circuit block provides a number of charge termination criteria: Peak voltage, PVD (for NiCd and NiMH); Minimum charge current (for Li-ion); Maximum temperature; and/or, Maximum charge time.

For safety, the circuit block inhibits fast charge until the battery voltage and temperature are within defined limits. If the battery voltage is below the low-voltage threshold, the circuit block uses trickle-charge to condition the battery. For NiMH batteries, the circuit block provides an optional top-off charge to maximize the battery capacity.

The circuit block initiates a charge cycle when it detects: Application of power to the USB port 168; Battery replacement; Exit from sleep mode; and/or, Capacity depletion (Li-ion only). Immediately following initiation, the circuit block enters a charge-qualification mode. The circuit block charge qualification is based on battery voltage and temperature. If the voltage on the BAT pin is less than the internal threshold VLB~' the circuit block enters the battery condition state. This condition indicates the possibility of a defective or shorted battery pack. In an attempt to revive a fully depleted pack, the circuit block enables the MOD pin to trickle-charge at a rate of once every 1.0 s.

Once battery conditioning (trickle charge) has raised the voltage on the BAT pin above V LBAT, the circuit block enters fast charge, if the battery temperature is within the V LTF to V HTF range. The circuit block will stay in the battery conditioning state indefinitely and will not progress to fast charge until the voltage on the BAT pin is above V LBAT and the temperature is within the V LTF and V HTF range. No timer is implemented during battery conditioning.

The baby blender was designed to use rechargeable NiCd, NiMH batteries, or Lithium-Ion batteries.

Charge Status Display:

When the user applies power to the USB port 168, the circuit block starts automatically charging the battery.

The LED indicator light 170 will display as follows:

Charging: Red blinking;

Fully charged: Green blinking.

Battery Monitor Indicator:

During normal operation, when the ON/OFF baggage safety switch 172 is ON, the LED indicator light 170 will change the color depending on the battery voltage as follow:

Green: 100-50%

Yellow: 50-25%

Red: 25-0%

Push button 160 and Motor 150:

When the push button 160 is pressed, the power coming from the diode switch is applied to the motor 150 when the ON/OFF baggage safety switch 172 is ON.

ON/OFF baggage safety switch 172:

The ON/OFF baggage safety switch 172 connects the power coming from the diodes switch to the battery monitor and motor 150.

Figure 7:
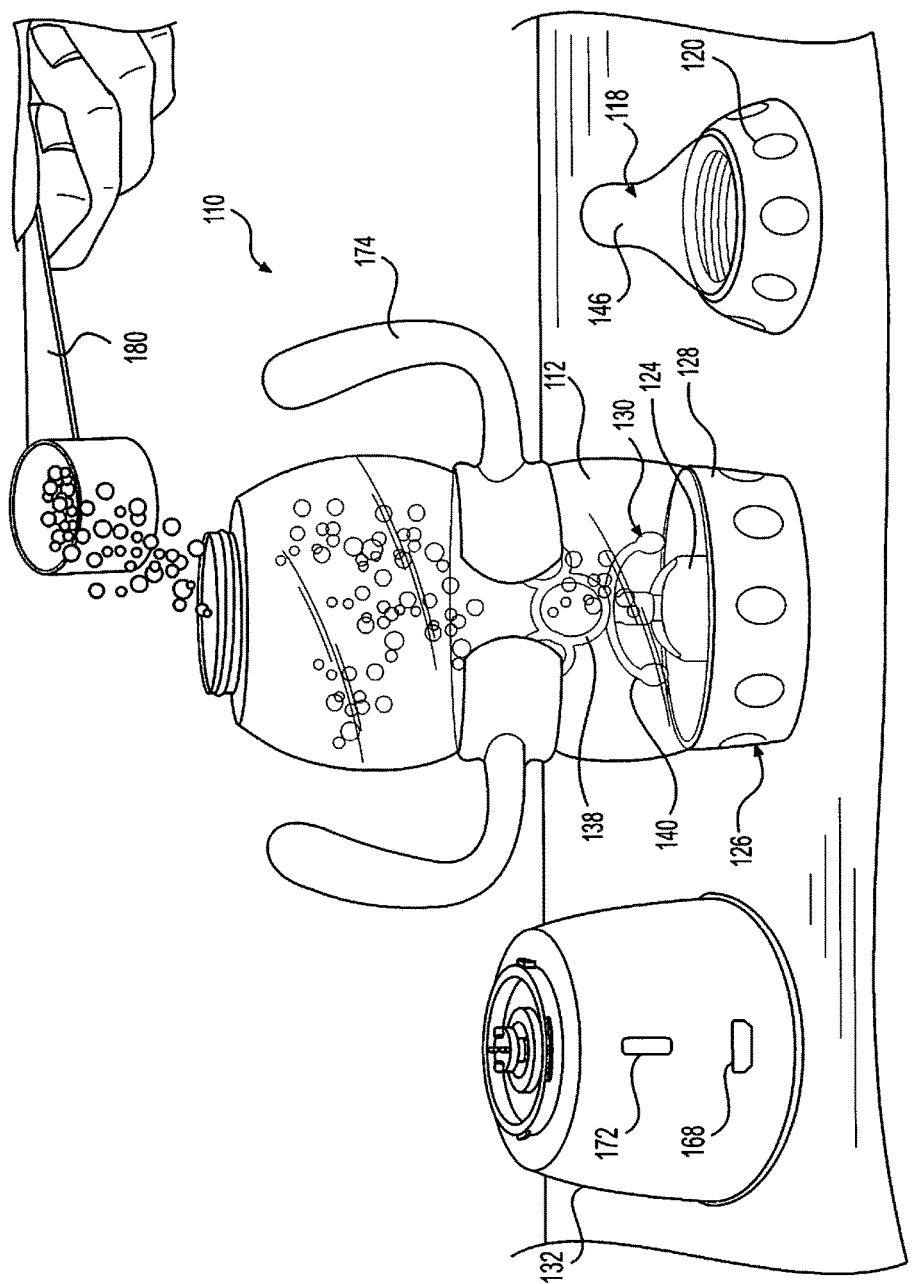
FIG. 7 is a perspective view showing the scoop of the present invention.

As shown in FIG. 7: a scoop 180 is provided for baby bottle 112 of the present invention. For use, one may place the formula in the liquid in the baby bottle 112 by the scoop 180.

The baby bottle blender 110 comprises a baby bottle 112 having a top collar 114 with external threads and a bottom collar 116 with external threads. A nipple cap 120 has nipple 118 and conventional type 146. A snap-in bottle handle 174 with two upward arms is provided. A sealing o¬ring disk 124 fits in to the bottom attaching cap 126.

The bottom attaching cap 126 has a rim 128 internally threaded. An agitating unit 130 (with an animal-shaped 25 character blade 138 and two arms 140) is centrally retained within the bottom attaching cap 126. When the rim 128 of the bottom attaching cap 126 is removable threaded onto the bottom collar 116 of the baby bottle 112 and against the sealing o-ring disk 124, the agitating unit 130 will extend into the bottom collar 116 of the baby bottle 112. A base member 132 engages with the agitating unit 130 in the bottom attaching cap 126 on the baby bottle 112. The base member 132 includes an USB port 168 and an ON/OFF baggage safety switch 172.

Figure 8A:
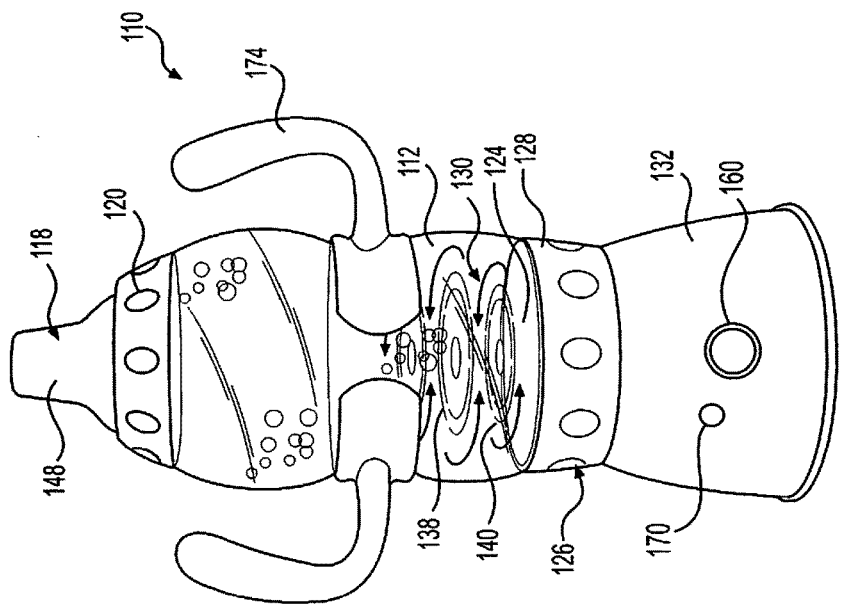
FIG. 8A is a closed bottle with formula and water of the present invention.

As shown in FIG. 8A: The user then closes the bottle 112 with the formula and water.

The baby bottle blender 110 comprises a baby bottle 112 having nipple cap 120 (with nipple 118) of conventional type 146. The nipple cap 120 is internally threaded to be removable threaded onto the top collar of the baby bottle 112. A sealing o-ring disk 124 fits in to the bottom attaching cap 126. A snap-in bottle handle 174 with two upward arms is provided.

The bottom attaching cap 126 has a rim 128 internally threaded. An agitating unit 130 (with an animal-shaped character blade 138 and two arms 140) is centrally retained within the bottom attaching cap 126. When the rim 128 of the bottom attaching cap 126 is removable threaded onto the bottom collar 116 of the baby bottle 112 and against the sealing o-ring disk 124, the agitating unit 130 will extend into the bottom collar 116 of the baby bottle 112.

Figure 8B:
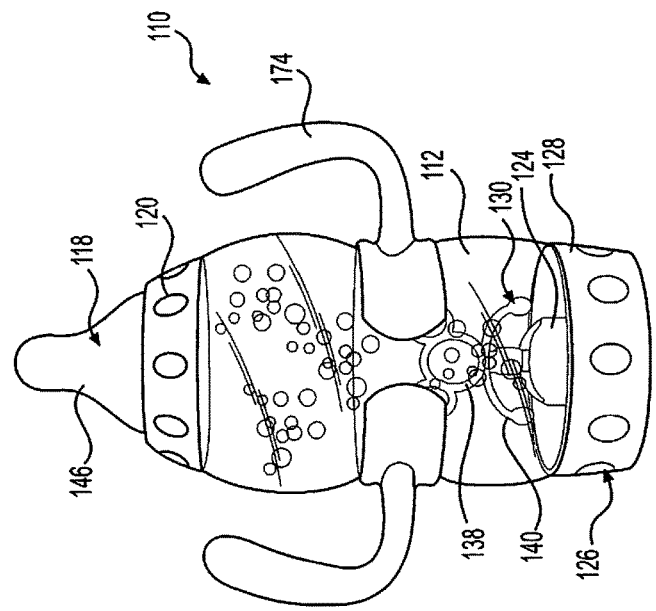
FIG. 8B is formula/water mixing procedure when the closed bottle attached to the base of the present invention.

As shown in FIG. 8B: the formula/water mixing procedure when the closed bottle 112 attached to the base member 132 of the present invention. Then, place the baby bottle 112 on the base member 132 and turn on the ON/OFF push button switch 160. After the formula is thoroughly mixed in the liquid the baby bottom 112 is detached from the base member 132.

The baby bottle blender 110 comprises a baby bottle 112 having nipple cap 120 (with nipple 118) of conventional type 146. The nipple cap 120 is internally threaded to be removable threaded onto the top collar of the baby bottle 112. A sealing o-ring disk 124 fits in to the bottom attaching cap 126. A snap-in bottle handle 174 with two upward arms is provided.

The bottom attaching cap 126 has a rim 128 internally threaded. An agitating unit 130 (with an animal-shaped character blade 138 and two arms 140) is centrally retained within the bottom attaching cap 126. When the rim 128 of the bottom attaching cap 126 is removable threaded onto the bottom collar 116 of the baby bottle 112 and against the sealing o-ring disk 124, the agitating unit 130 will extend into the bottom collar 116 of the baby bottle 112.

A base member 132 has ON/OFF push button switch 160 and LED indicator light 170.

In summary the baby bottle blender 110 is an apparatus that can be used to mix formula without employing a messy, inefficient, standard method.

The blender 110 may be produced from BPA-Phthalates ¬ PVC-free plastics and similar, durable materials.

The blender 110 may be the same size as a standard baby bottle. The exact dimensions, materials used for construction and method of operation of the baby bottle blender 110 may vary upon manufacturing.

It will be understood that each of the elements described above, or two or more together, may also find a useful application in other types of constructions differing from the types described above.

While the invention has been illustrated and described as embodiments of a baby bottle blender, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A baby bottle blender which comprises:
    a baby bottle having a top collar and a bottom collar,
    a nipple,
    a nipple cap having a central aperture, the nipple cap removably attached to the top collar, the nipple mounted through the central aperture of the nipple cap and removably retained between the top collar and the nipple cap,
    a bottom attaching cap removably attached to the bottom collar,
    a sealing o-ring disk disposed in the bottom attaching cap and retained in a sealing engagement between the bottom collar and the bottom attaching cap, the sealing o-ring disc having an aperture therethrough and at least one upwardly extending sidewall tab,
    an agitating unit removably disposed in the baby bottle, and
    a base member having an electric motor interconnected to the agitating unit through the bottom attaching cap, the electric motor operates the agitating unit to mix formula within the baby bottle.

2. The baby bottle blender as recited in claim 1 wherein the baby bottle is contoured to facilitate gripping the baby bottle.

3. The baby bottle blender as recited in claim 1 wherein the nipple comprises a conventional type nipple.

4. The baby bottle blender as recited in claim 1 wherein the nipple comprises a sippy type nipple.

5. The baby bottle blender as recited in claim 1 wherein the nipple comprises an anti-colic air valve.

6. The baby bottle blender as recited in claim 1 wherein the agitating unit comprises a transfer case having a vertical driven shaft, the transfer case mounted to the bottom attaching cap with the vertical driven shaft removably coupled to the agitating unit.

7. The baby bottle blender as recited in claim 6 wherein the electric motor is mounted in the base member, the electric motor has a vertical drive shaft extending upwardly through a top recess of the base member and is removable coupled to the transfer case of the agitating unit mounted in the bottom attaching cap,
    a switch in the base member electrically connected to the electric motor, and
    a rechargeable power source electrically connected to the switch, whereby when the switch is turned on the power source will activate the electric motor to rotate the vertical drive shaft, causing the agitating unit to spin.

8. The baby bottle blender as recited in claim 7 wherein the power source comprises a plurality of rechargeable batteries.

9. The baby bottle blender as recited in claim 8 wherein the base member further comprises:
    a printed circuit board mounted therein and electrically connected to the rechargeable batteries,
    a USB port electrically connected to the printed circuit board to allow a USB charger to charge the rechargeable batteries, and
    an LED indicator light electrically connected between the printed circuit board and the rechargeable batteries.

10. The baby bottle blender as recited in claim 8 wherein the base member further comprises a baggage safety switch electrically connected to the printed circuit board, such that the electric motor will not operate and discharge the rechargeable batteries when the baggage safety switch is actuated.

11. The baby bottle blender as recited in claim 1 where the blender is produced from BPA-Phthalates-PVC-free plastics.

12. A baby bottle blender which comprises:
    a baby bottle having a top collar and a bottom collar,
    a nipple,
    a nipple cap having a central aperture, the nipple cap removably attached to the top collar, the nipple mounted through the central aperture of the nipple cap and removably retained between the top collar and the nipple cap,
    a bottom attaching cap removably attached to the bottom collar, a sealing o-ring disk disposed in the bottom attaching cap and retained in a sealing engagement between the bottom collar and the bottom attaching cap, the sealing o-ring disc having an aperture therethrough and a plurality of upwardly extending sidewall tabs, an agitating unit removably disposed in the baby bottle, and a base member having an electric motor interconnected to the agitating unit through the bottom attaching cap, the electric motor operates the agitating unit to mix formula within the baby bottle.

13. The baby bottle blender as recited in claim 12 further comprising a snap-on bottle handle removably attached to the baby bottle between the top collar and the bottom collar, the snap-on bottle handle comprising a plurality of arms.

14. The baby bottle blender as recited in claim 12 wherein the agitating unit comprises an animal-shaped character mixing blade.

15. A baby bottle blender which comprises:
a baby bottle having a top collar and a bottom collar,
a nipple,
a nipple cap having a central aperture, the nipple cap removably attached to the top collar, the nipple mounted through the central aperture of the nipple cap and removably retained between the top collar and the nipple cap,
a bottom attaching cap removably attached to the bottom collar,
a snap-on bottle handle removably attached to the baby bottle,
a sealing o-ring disk disposed in the bottom attaching cap and retained in a sealing engagement between the bottom collar and the bottom attaching cap, the sealing o-ring disc having an aperture therethrough and at least one upwardly extending sidewall tab,
an agitating unit removably disposed in the baby bottle, the agitating unit comprising an animal-shaped character mixing blade, and
a base member having an electric motor interconnected to the agitating unit through the bottom attaching cap and sealing o-ring disc, the electric motor operates the agitating unit to thoroughly blend a formula in a liquid in the baby bottle in approximately seven seconds.

16. The baby blender as recited in claim 15 wherein the sealing o-ring disc further comprises a cylindrical base portion, the sealing engagement at least partially defined by an outer periphery of the cylindrical base portion disposed between the bottom collar and the bottom attaching cap.

17. The baby blender as recited in claim 15 wherein the sealing o-ring disc further comprises a plurality of upwardly extending sidewall tabs.

18. The baby blender as recited in claim 16 wherein the sealing o-ring disc further comprises a plurality of upwardly extending sidewall tabs.

* * * * *